United States Patent [19]
Leslie et al.

[11] Patent Number: 5,218,715
[45] Date of Patent: Jun. 8, 1993

[54] MULTI-DONOR BOOSTER OPERATION AND SYSTEM

[75] Inventors: Samuel A. Leslie, Forest; William A. Bowen; Michael W. Evans, both of Lynchburg, all of Va.

[73] Assignee: Orion Industries, Inc., Solon, Ohio

[21] Appl. No.: 641,173

[22] Filed: Jan. 15, 1991

[51] Int. Cl.$^5$ .............................................. H04B 7/14
[52] U.S. Cl. ...................................... 455/15; 455/33.2
[58] Field of Search ...................... 455/9, 15, 17, 33; 379/60; 375/4

[56] References Cited

U.S. PATENT DOCUMENTS

| | | | |
|---|---|---|---|
| 4,475,010 | 10/1984 | Huensch et al. | 455/33 |
| 4,578,815 | 3/1986 | Persinotti | 455/15 |
| 4,613,990 | 9/1986 | Halpern | 455/33 |
| 4,677,687 | 6/1987 | Matsuo | 455/10 |
| 4,718,108 | 1/1988 | Davisdon et al. | 455/17 |
| 4,727,590 | 2/1988 | Kawano et al. | 455/33 |
| 4,849,963 | 7/1989 | Kawano et al. | 370/30 |
| 5,023,930 | 6/1991 | Leslie | 455/9 |
| 5,023,930 | 6/1991 | Leslie et al. | 455/9 |

OTHER PUBLICATIONS

Article The Cell Enhancer, published before Jan. 15, 1990 by Edwin W. Quinn.
Patent Application published European Patent Applitaction 0 406 905 A2 entitled "Dual Donor Booster System", published on Jan. 9, 1991.

Primary Examiner—Reinhard J. Eisenzopf
Assistant Examiner—Christine K. Belzer
Attorney, Agent, or Firm—Dressler, Goldsmith, Shore, Sutker & Milnamow, Ltd.

[57] ABSTRACT

A system and method for handing back a movable transceiver to a different cell site from the original cell site includes circuitry for sensing signals from the movable transceiver which are transmitted on a modified frequency as well as circuitry for translating those signals back to their originally assigned frequencies without changing the detected field strength of the signal, in combination with circuitry for forwarding the translated signals to the different cell site for hand-off evaluation. The method includes sensing the received signals, translating the received signals to an originally assigned frequency based on either a fixed offset or other provided information concerning the translation along with a step of continually updating those frequencies which are to be retranslated.

21 Claims, 8 Drawing Sheets

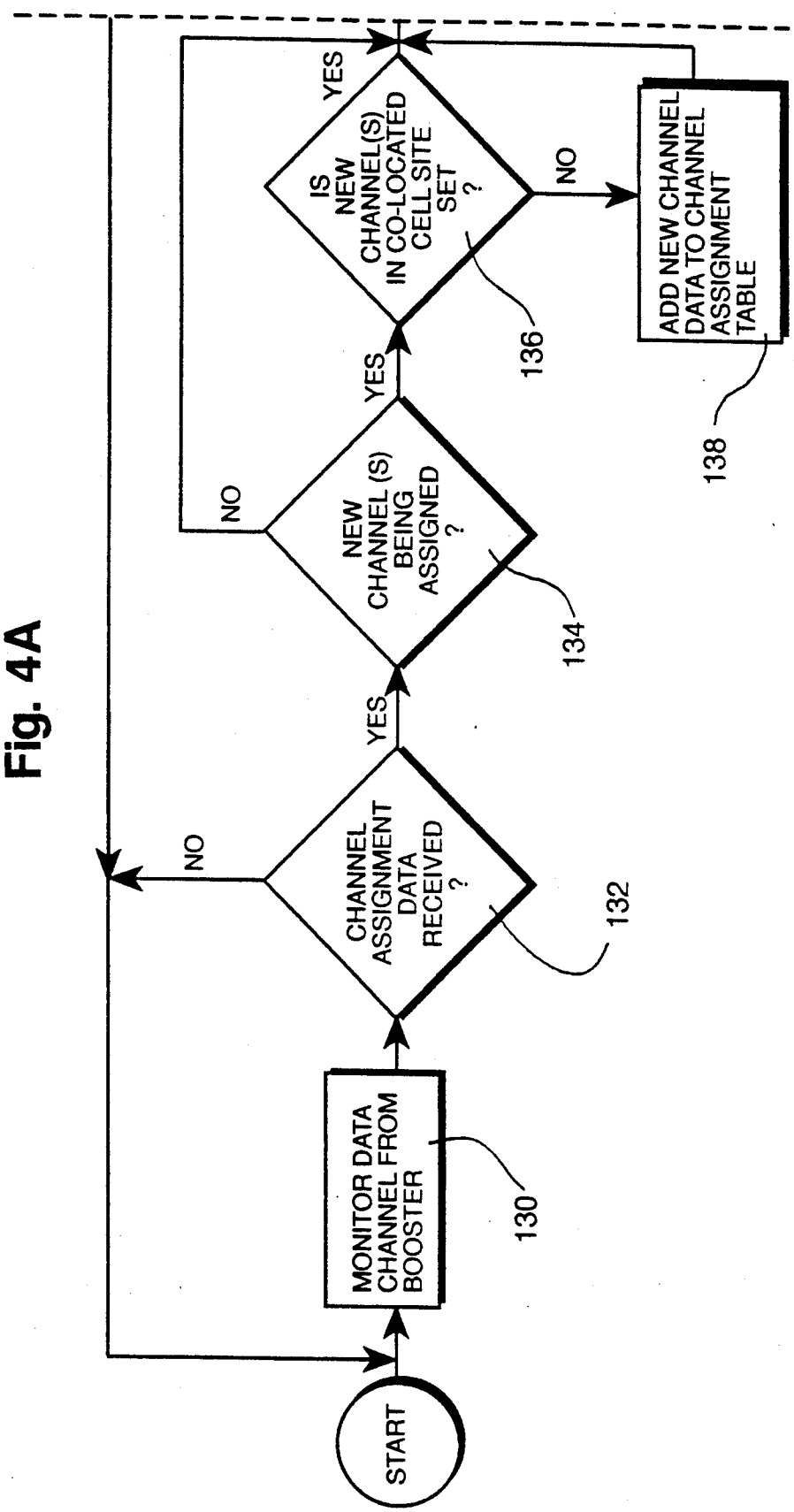

MULTI-DONOR BOOSTER OPERATION AND SYSTEM

FIELD OF THE INVENTION

The invention pertains to the field of radio telephone systems More particularly, the invention pertains to devices and methods for improving coverage or service in cellular radio telephone systems.

BACKGROUND OF THE INVENTION

Booster units have been used to improve the performance and coverage of known cellular radio-telephone systems. One type of booster is disclosed in Leslie et al. U.S. Pat. No. 4,941,200 entitled "Booster", assigned to the assignee of the present invention and incorporated herein by reference.

Boosters of the type disclosed in the above-noted Leslie et al. patent translate the boosted output to a frequency that is different from the received frequency The cell site that is nominally controlling the mobile or movable transceiver is unaware of this frequency change.

Previous boosters could hand-in from several cell-sites but were limited to handing back to the same cell-site. Therefore, in the small number of instances when a boosted call continued long enough for the mobile to drive out of the booster's and the donor's range, the call would drop.

The "hand-back to a different cell-site" dilemma occurs simply because to the serving cellular system the mobile is on one voice channel while the booster actually has it translated to another. When a boosted mobile drives out of the booster's range, the signal will become weak at the booster and the donor (the reverse path is linear).

The donor cell will then identify the mobile as a candidate for hand-off and the cellular system will try to find the mobile in the cell-sites adjacent to the donor cell site. Since the mobile is actually on the booster's translated voice channel, it will not be detected and located and hand-off will not occur.

Thus, it would be desirable to be able to provide an apparatus usable by the adjacent cell-sites to detect the mobile on the voice channel assigned by the donor cell. Once this has been accomplished, the cellular system can determine which adjacent cell the mobile is driving into, assign a voice channel in that cell, and then send a hand-off message for the mobile to go to that channel.

SUMMARY OF THE INVENTION

Multi-donor operation can be effected by placing a reverse-translating device at each of the adjacent cell-sites to which the booster must hand-off. The device would be connected to the cell-site receive antennas to scan for boosted mobiles or movable transceivers and then translate those mobiles or transceivers back to the donor's voice channel for presentation to the cell-site's locating receiver.

A method and an apparatus in accordance with the invention provide enhanced hand-off capability of a movable transceiver between first and second fixed transmitter/receivers, each of which has a predetermined area of coverage.

A radio frequency booster is provided to extend the coverage of a first fixed transmitter/receiver and overlaps partially the coverage area of the second fixed transmitter/receiver. The booster is a frequency translation-type booster which communicates with the first fixed or transmitter/receiver on a frequency pair assigned by the fixed transmitter/receiver unit.

The booster communicates with a movable transceiver in its coverage area on a second set of frequencies assigned by it. The second set of frequencies is different from the first set.

While the movable transceiver unit is in the coverage area of the booster, it communicates via the booster with the first fixed transmitter/receiver site. The fixed transmitter/receiver site is unable to detect that the booster has directed the movable unit to a different channel pair.

As the movable transceiver moves toward the area of coverage of the second, fixed, transmitter/receiver, the inventive apparatus translates signals from the movable transceiver, on the booster assigned frequency, back to the frequency originally assigned by the first fixed transmitter/receiver. The translation, with respect to the field strength of the signal is linear and the hand-off circuitry of the second fixed transmitter/receiver system can then evaluate whether or not the movable transceiver can be handed-off from the first fixed transmitter/receiver to the second fixed transmitter/receiver.

The reverse translation process can be accomplished by having the booster send to the translation apparatus information concerning the translated frequencies. Alternately, the booster can be programmed to translate the frequencies for the movable unit by a fixed amount or offset in each instance This fixed offset can then be programmed into the translation apparatus.

The method includes the steps of sensing signals transmitted from the movable transceiver; translating the sensed signals to a frequency originally assigned by the first fixed transmitter/receiver and forwarding the translated signals, with a substantially unchanged field strength with respect to the detected signals, to evaluation circuitry of the second fixed transmitter/receiver unit.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENTS

Figure 1:
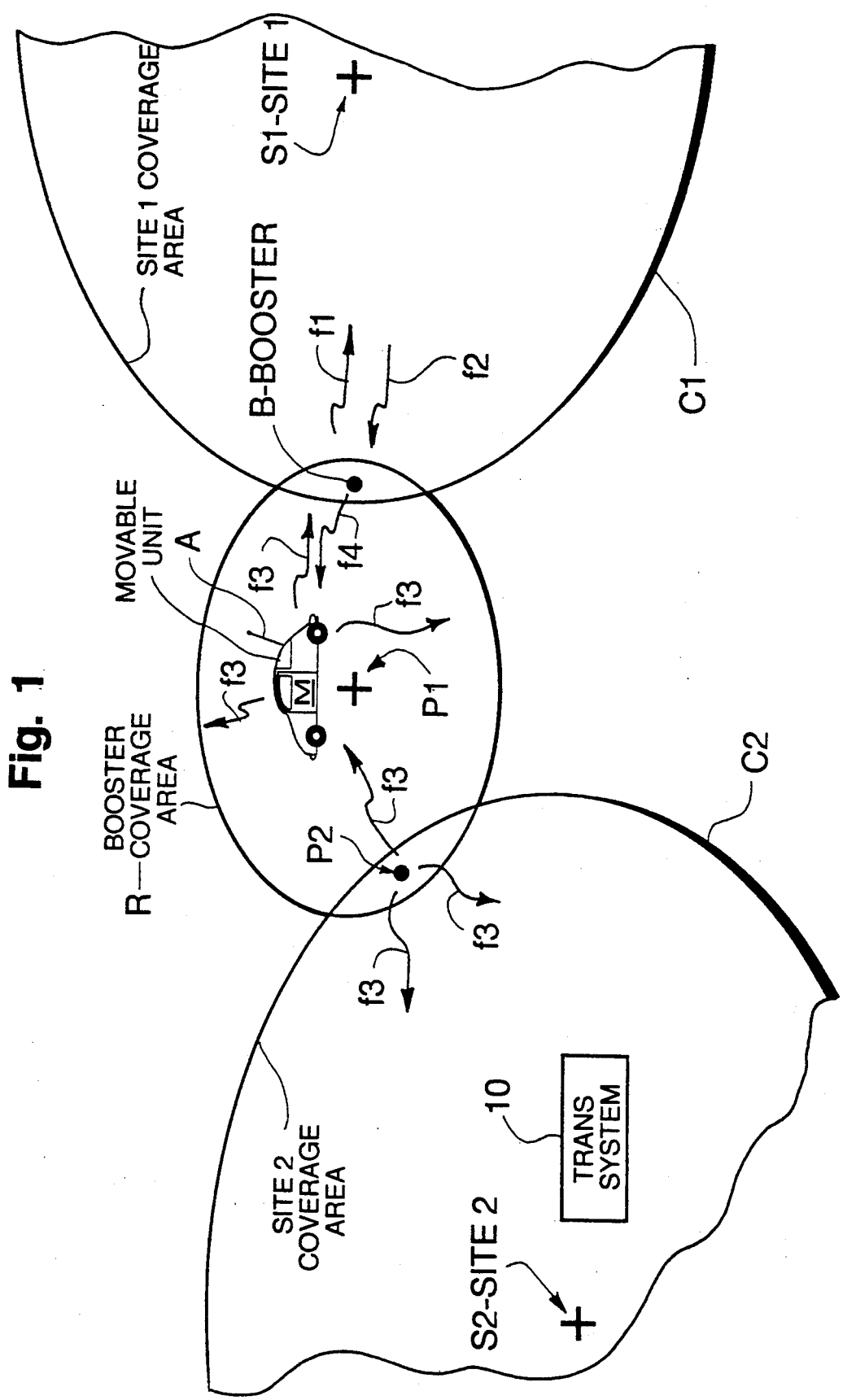
FIG. 1 is a plan view illustrating schematically coverage areas of first and second fixed transmitter/receiver systems, as well as an overlapping coverage area of a booster associated with the first fixed transmitter/receiver unit.

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

To allow the multi-donor device to translate a mobile or movable transceiver back to its original channel, an apparatus is provided to pass the relationship between the boosted channel that has been assigned to the mobile and the original channel that was assigned by the donor cell to the multi-donor device. This apparatus makes it possible to translate each mobile back to its originally assigned channel.

Two methods are disclosed for obtaining the correct channel relationship for translation The first depends on a known relationship between the boosted channel and the original channel assigned by the donor cell, described later on as the self-tuning combiner method. The second depends on the sending of channel assignment data from the booster to the apparatus via a data channel.

FIG. 1 illustrates a mobile unit or movable transceiver M in an area serviced by a booster B. The booster B has a coverage area R.

Associated with booster B is a fixed, transmitter/receiver site S1 with a coverage area C1. In a cellular radio-telephone system the site S1 would be a conventional cell site.

A second fixed, transmitter/receiver site S2, illustrated in FIG. 1, has a coverage area C2. Coverage areas C1 and C2 may but need not overlap in part.

The coverage area R overlaps the region C2 in part. When the unit M is in the coverage area R, it is serviced directly by the booster B although it continues to be under the control of site S1.

The booster B communicates with site S1 on a pair of channels F1 and F2 that were previously assigned to the unit M by site S1. Subsequently, booster B reassigned the unit M to a different pair of channels F3 and F4 to provide it service in the region R.

As the unit M moves in the region R, it transmits on frequency F3 by means of an omni directional antenna A. As the unit M moves from position P1 to position P2 communication is maintained with site S1 via booster B.

When unit M approaches position P2, it enters coverage region C2 and is a candidate for hand-off to site S2. A system 10 located in the vicinity of site S2 will translate the signals radiated at Frequency F3 back to Frequency F1 thereby enabling site S2 and the related system to evaluate same for hand-off.

Figure 2:
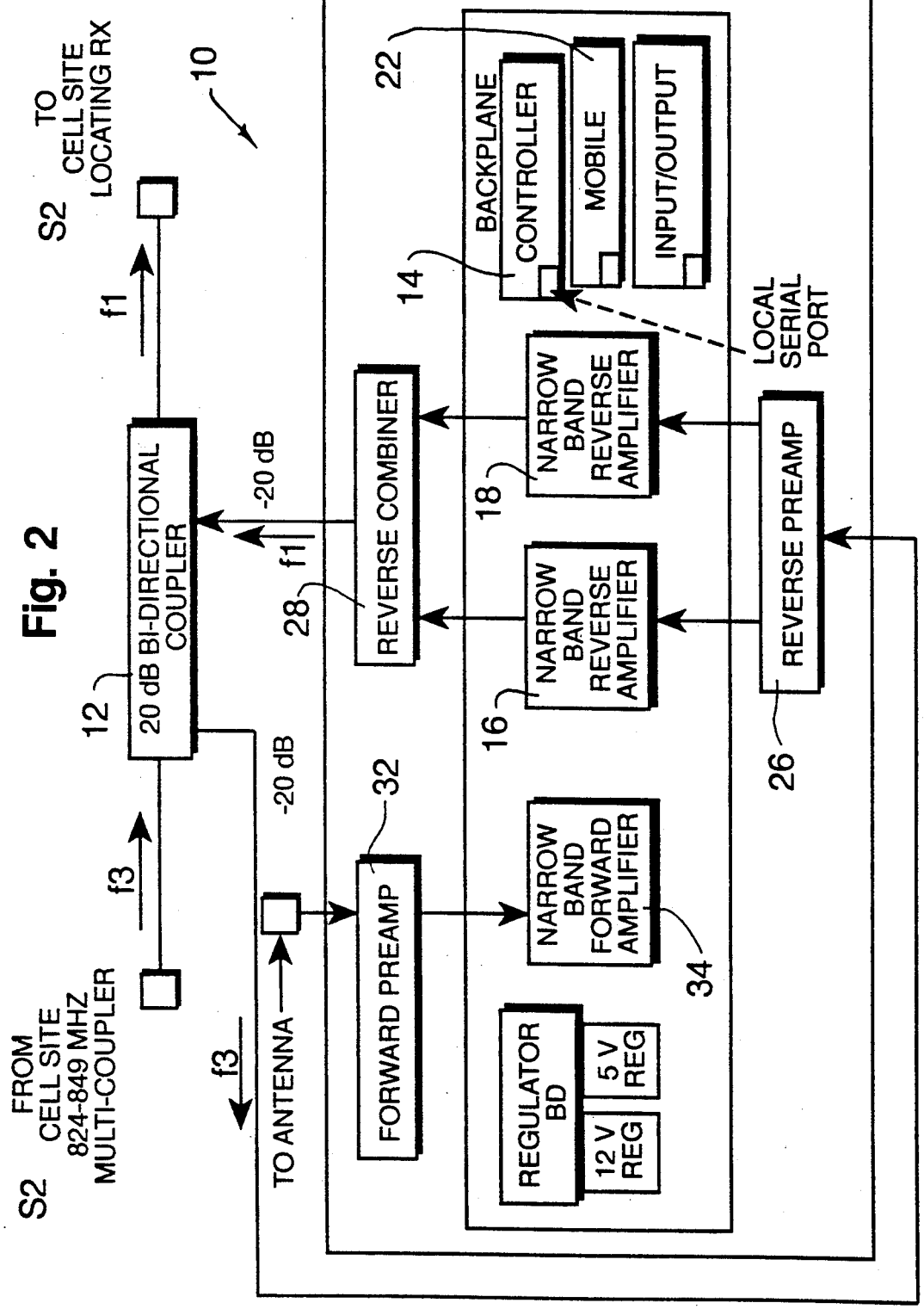
FIG. 2 is a block diagram schematic of an apparatus in accordance with the present invention for translating boosted signals to an originally assigned frequency or frequencies.

A block diagram of the system 10 is illustrated in FIG. 2. Signals on Frequency F3 from the unit M are received at the antenna (not shown) of site S2 and directed to the coupler 12. A 20 dB bi-directional coupler 12 is employed for sampling the signals from the boosted mobile M and for coupling the translated signals back into the input of the locating or measuring receiver equipment of the target site S2.

A microprocessor and stored program 14 are employed to control the translating hardware, which includes narrow-band reverse (824–849 MHz) amplifiers 16, 18 that are programmable to any channel in the cellular band. A signal F3 can thus be translated to a frequency F1 and forwarded to coupler 12. Coupler 12 is also connected to the hand-off evaluating receiver, equipment (not shown) of site S2. Hand-off evaluation can then proceed as is conventional.

The return path, F3, from the unit M is linear to provide for hand-off Hence, the system 10 adjusts translated signals, such as F1, in level to provide a signal to the locating receiver for site S2 at the same level as the level of signal F3 being received from the boosted unit M.

An RS-232 interface 22 is provided for loading parameter data (such as scan lists and offset relationships) to into the memory portion of processor 14. The processor 14 can be any commercially available microprocessor that can service the system 10 at a sufficiently high rate.

A reverse preamp circuit 26 provides initial amplification of received, translated signals such as F3. A reverse combines 28 combines the retranslated signals (F3 to F1) with a level corresponding to the level of the received F3 signals. The combined, retranslated signals are then forwarded to coupler 12.

Also shown is a forward preamp 32 and narrow band amplifier (869–894 MHz) 34 that may be used for receiving data messages from the booster B. A separate antenna input is required for amplifier 32 and 34. Amplifier 34 is not required for the self-tuning combiner method, but is required for the data channel method described below.

For either approach, at least one narrow-band reverse amplifier such as amplifier 16, is required for translating the selected, boosted mobile channel back to its original donor assigned channel. One reverse amplifier 16 may suffice where a relatively low number of channels are being boosted, since that amplifier may be set to scan the boosted channels to select the mobile or movable unit M that is closest (i.e., strongest signal strength) to the target cell site S2.

Additional reverse amplifiers such as 18 may be added if mobile traffic is such that multiple mobiles will require their signals to be translated back to their original channel assignments at the same time. One reverse channel amplifier such as 16 should suffice for most applications.

Also with either control method, hand-off can be provided with any number of donor and target cell sites, assuming that adequate signal paths exist over the desired mobile coverage area.

A typical process would be for a call to be set up from a movable unit M via the booster B through the booster's dedicated donor cell site S1. The unit M may then move to the target cell site S2 area C2, and then be handed off to the target cell.

Hand-off would be accomplished by the system 10 presenting the necessary signal on the assigned channel at the target cell site S2, thus allowing the cellular system to perform the hand-off. The system would send the hand-off message to the unit M from the donor cell S1 via the booster path. In addition, any mobile unit that is operating in the area of donor cell S1 that is captured by the booster B because of its proximity to the booster can also ultimately be handed off to the target cell S2 via the system 10 at the target cell S2.

A system 10 can also be co-located at the donor cell site S1 to allow mobiles that were captured by the booster B from other cell sites to be handed off to the donor site S1 if that mobile moves into that cell site's area. Translation units, corresponding to system 10 can be placed at several adjacent target cell sites to allow complete freedom for mobiles to move between various cell sites that are in range of the booster B.

Self-Tuning Combiner Method

This method operates by having the booster B assign a boosted voice channel F3 based upon a known relationship or offset to the voice channel F1 that was assigned by the donor cell S1. In its simplest version, the booster B can always assign a fixed offset to the channel F1 assigned by the donor cell S1.

For example, if the donor cell S1 assigned channel 300 to the mobile M, the booster B could add a channel offset of, for example, 5 channels to this number, and reassign the mobile M to channel 305 (F3). The booster B would then translate the signal F3 from the mobile M back to channel 300 to maintain communication with the cell site on channel 300 (F1).

This offset information would then be loaded into the memory of processor 14. The system 10 would always look for signals that are 5 channels higher than those assigned by the donor cell S1.

When one is detected that exceeds the input threshold, that signal could be translated back to the originally assigned donor channel Thus, a mobile signal will be presented to the target cell S2 on its correct channel (F1), thereby enabling the cellular system to hand-off the mobile M to the target cell S2 if it indeed is weak at the donor cell S1 and strong at the target cell S2.

This approach requires the use of a self-tuning combiner at the booster B, since the boosted voice channel F3 has to maintain a known relationship with the voice channel F1 assigned by the donor cell S1. The relationship can be one of a fixed offset from the donor channels, or can be any known offset relationship. In either case, the offset relationship is loaded into the memory of the system 10 so that the signal from the movable unit M, F3, will be translated back to the correct channel F1.

Figure 3:
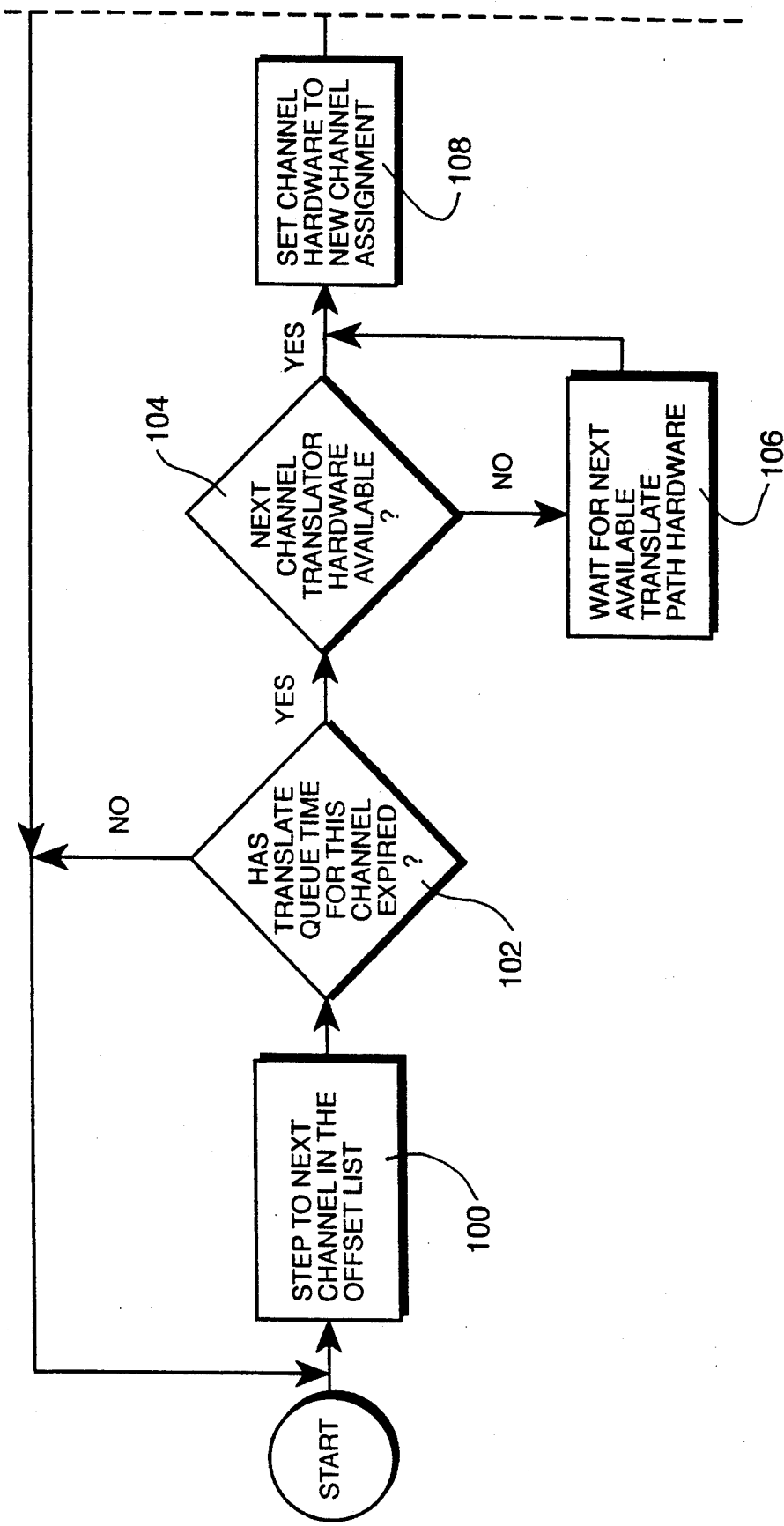
FIG. 3 is a flow diagram of a method in accordance with the present invention for translating signals emanating from a movable transceiver back to an originally assigned frequency.
Figure 3:
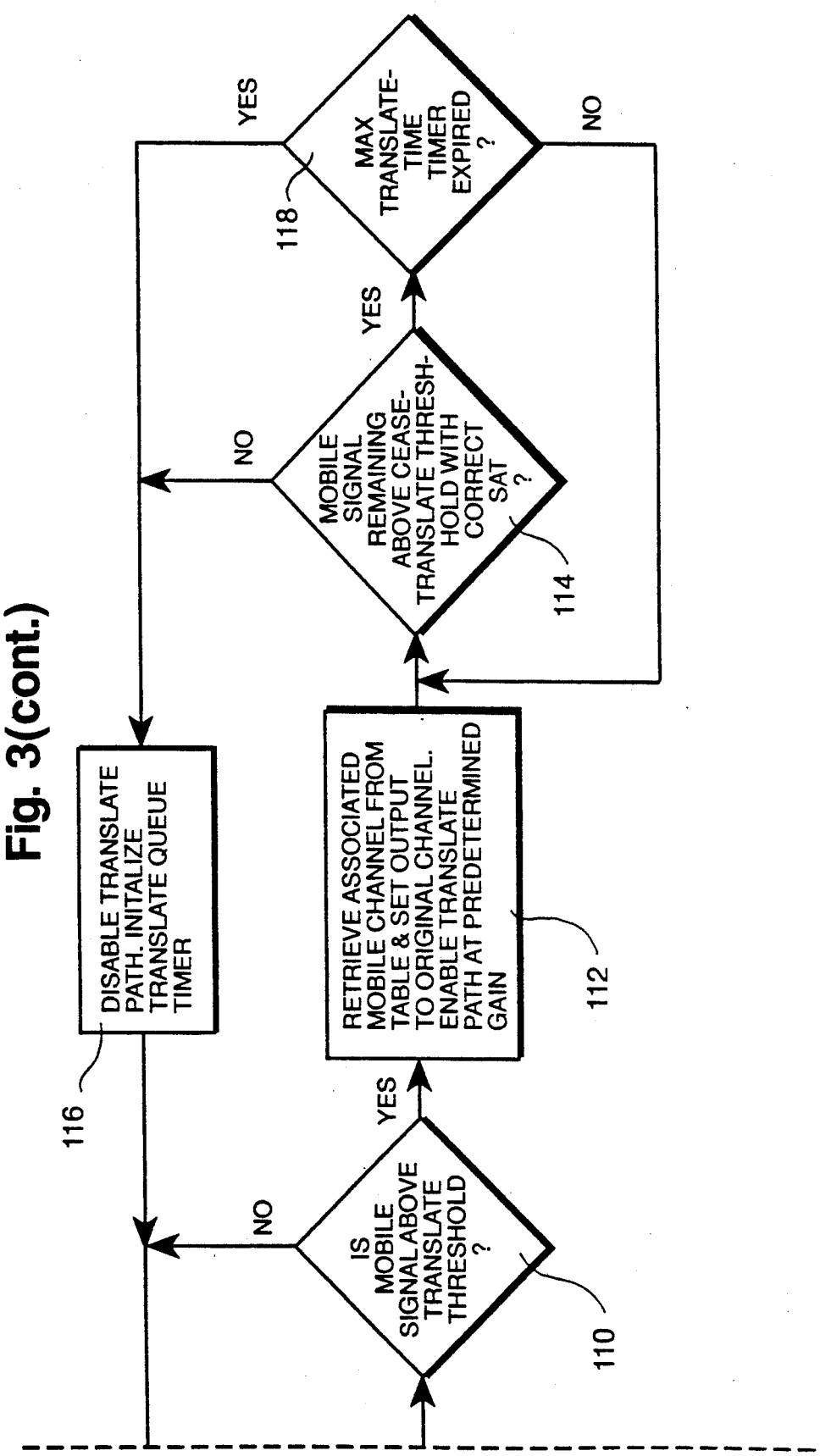

The flow diagram of FIG. 3 illustrates the steps of this method. A scan list is initially loaded into the system 10. The scan list is the total list of boosted channels from the booster B. Each boosted channel in the scan list will have an associated donor cell site channel that corresponds to the boosted channel, along with the donor cell's assigned SAT (Supervisory Audio Tone) signal.

The system 10 steps to the next channel in the scan list, step 100, and determines if that channel has recently been translated (TRANSLATE QUEUE TIME) in step 102. If the channel has been translated within the TRANSLATE QUEUE TIME period, then that channel is bypassed, and the next channel from the list is tested.

The TRANSLATE QUEUE TIME allows time for other mobiles to be tested if this mobile had already been translated but the system did not hand it off to the target cell S2. If this channel has not recently been translated, the system 10 next determines if it has free translate hardware available for use in a step 104. If not, it waits until the next translate hardware path is available in a step 106.

If available, in a step 108, the channel hardware is tuned to the new channel assignment. The channel hardware input is then set to the boosted channel F3 on which the boosted mobile M is operating, and the output is set to the channel F1 on which the cellular system expects the mobile M to be operating.

The system 10 in a step 110 next measures the signal level from the boosted mobile (channel F3) over a short period of time to determine if it exceeds a TRANSLATE THRESHOLD. The TRANSLATE THRESHOLD is programmable, and is selected by the system operator to present a translated signal to the target cell site S2 based on the boosted mobile being relatively close to the target cell site If the booster mobile M is not close enough, then the signal will be below the selected TRANSLATE THRESHOLD and the system 10 will step to the next boosted channel.

If the boosted mobile M exceeds the TRANSLATE THRESHOLD, then the translate hardware path is enabled to present a signal to the target cell site S2 locating receiver via the bi-directional coupler 12 in a step 112.

The boosted mobile signal F3 is continuously monitored to make sure it stays above the selected TRANSLATE THRESHOLD in a step 114. If it drops below the TRANSLATE THRESHOLD, the system 10 translate path amplifier channel 16 or 18 is disabled, the TRANSLATE QUEUE TIME timer is started for this channel, and the hardware is freed up for the next candidate boosted mobile in a step 116.

If the boosted mobile signal remains above the selected TRANSLATE THRESHOLD, the mobile signal is translated until the MAX TRANSLATE TIME timer has expired in a step 118. The MAX TRANSLATE TIME timer may also be selected by the system operator, and is set to a period of time long enough to allow the cellular system to complete its locate and hand-off functions (typically 7 to 15 seconds) Upon expiration of the MAX TRANSLATE TIME timer, the translate path is disabled, the TRANSLATE QUEUE TIME timer is started for this channel, and the hardware is freed up for the next candidate boosted mobile in the step 116.

DATA CHANNEL METHOD

Figure 4A:
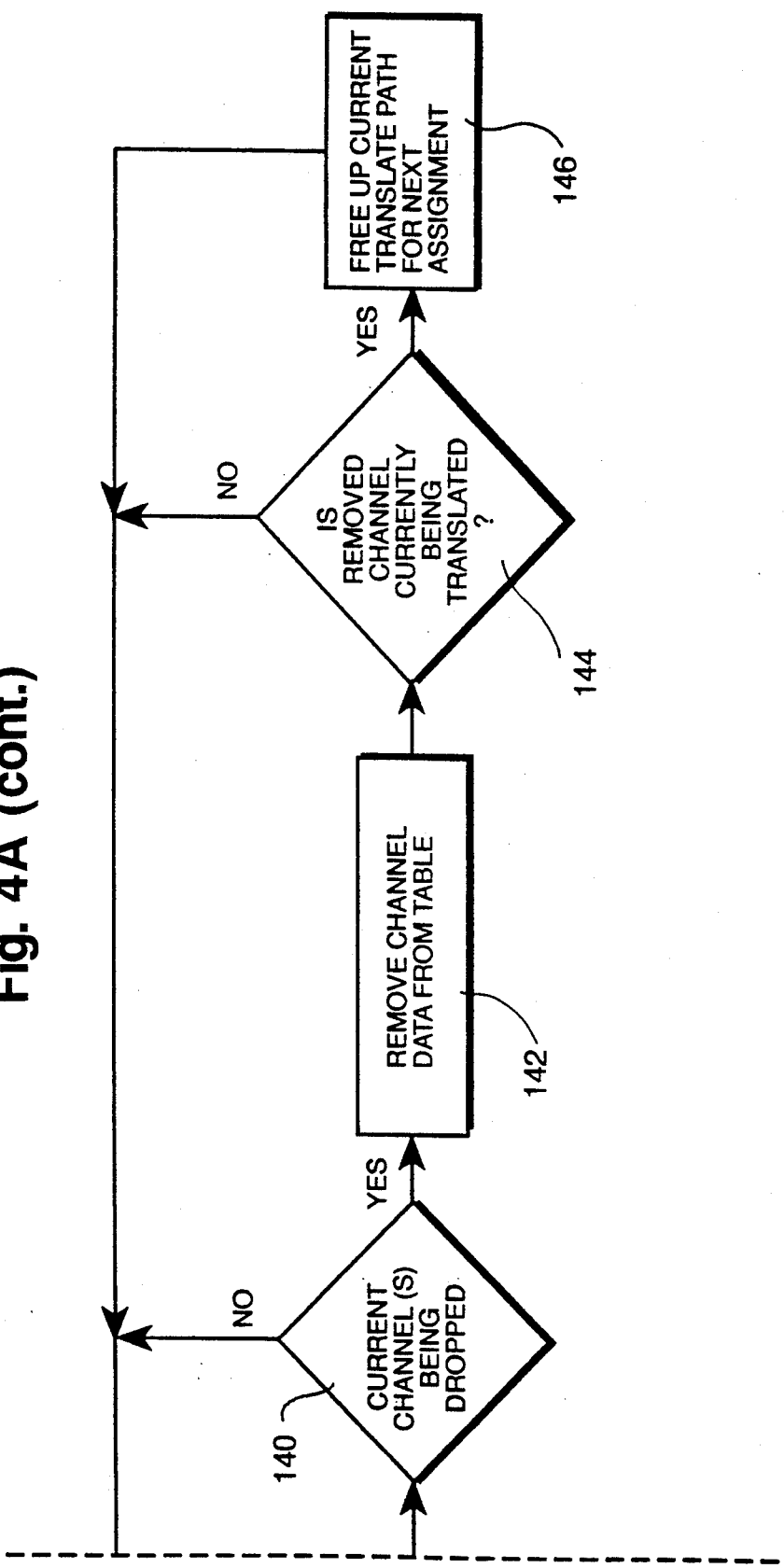
FIG. 4A is a flow diagram of an alternate method of carrying out the frequency translating process.
Figure 4B:
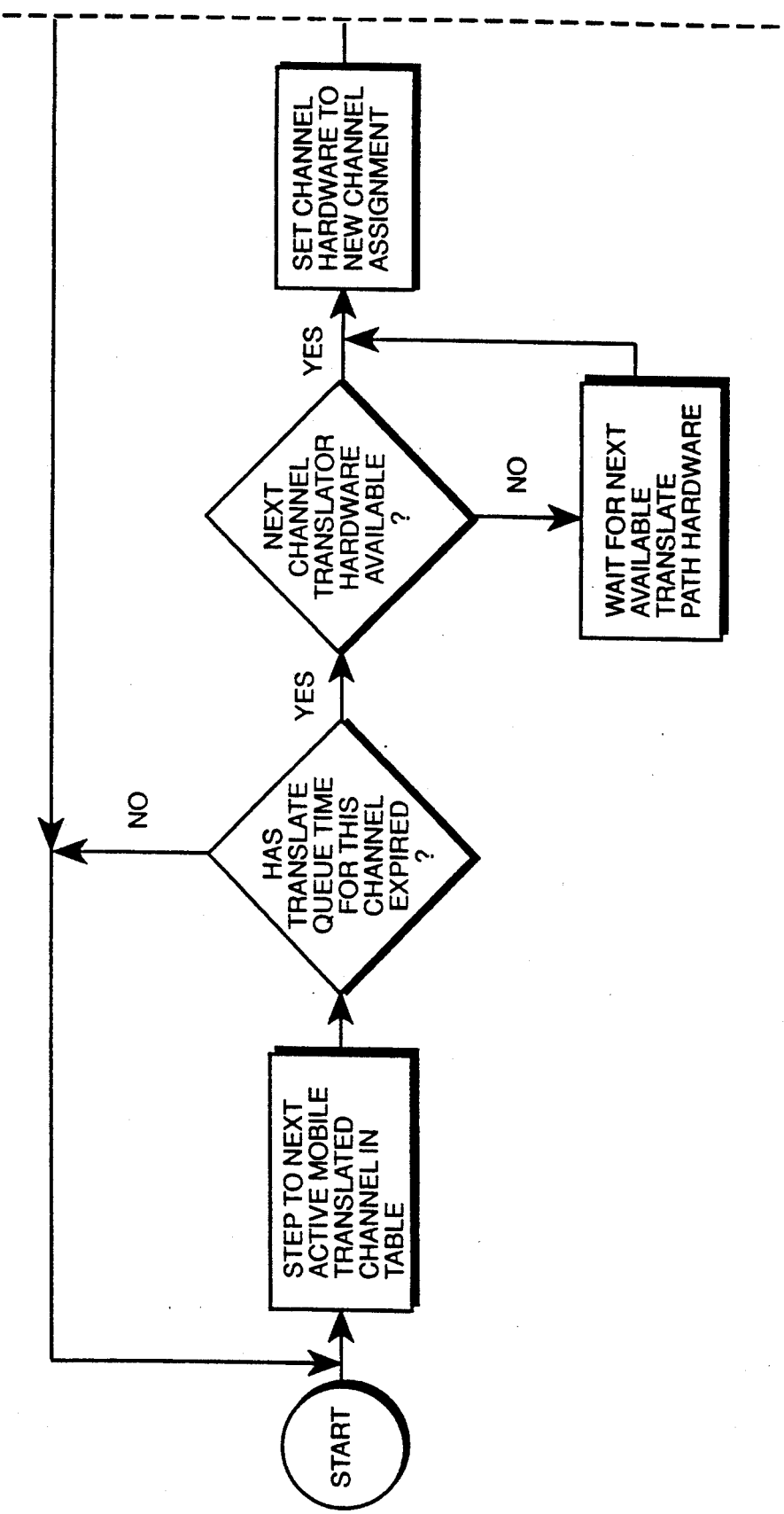
FIG. 4B is a variation of the alternate method of FIG. 4A.
Figure 4B:
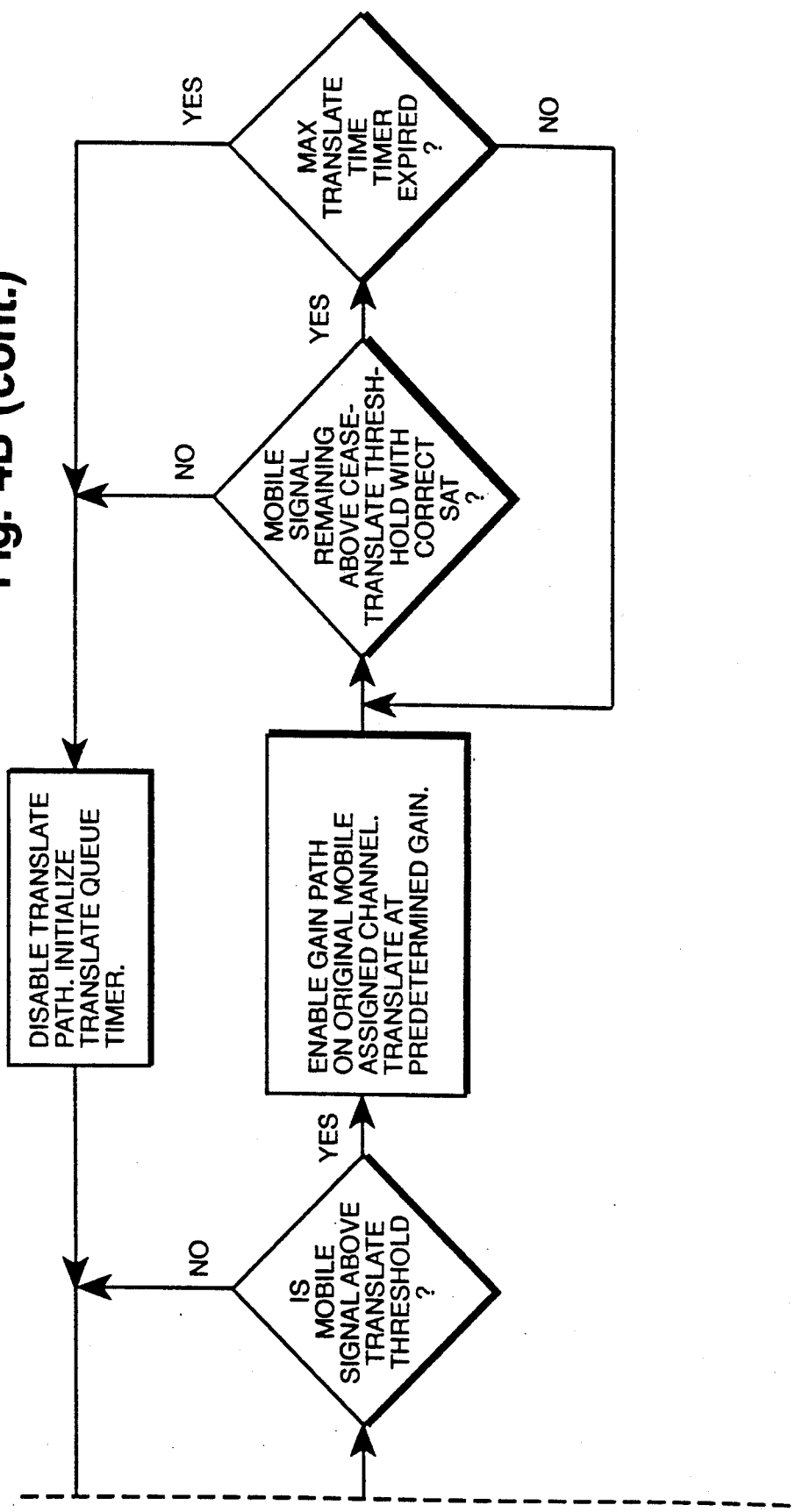

Two variations of an alternate method of operating the system 10 are illustrated in the flow charts of FIGS. 4A and 4B.

The method of FIG. 4A operates by sending data from the booster B to the system 10 to indicate which donor channel assignment F1 is associated with an assigned boosted channel F3 for a given mobile unit. This approach allows the use of a fixed transmitter combiner at the booster B. That is, a 5-channel system in the booster B would be assigning four specific voice channels from any one of N voice channels that may be assigned by the donor cell site S1.

Operation for this method is similar to that described previously for the self-tuning combiner approach illustrated in the flow chart of FIG. 3. In addition to scanning boosted mobile channels and translating those that exceed the threshold, the system 10 when implementing the method of FIG. 4A monitors a data channel from the booster B to determine which boosted channels are to be monitored and the corresponding channels to which the signal is to be translated. (Preamp 32 and amp 34 of system 10).

The data channel is a pre-assigned forward control or voice channel not used by the cellular system. It will contain discontinuous and relatively infrequent data transmissions from the booster B to the system 10. The data stream includes the MIN of mobiles being boosted, their system assigned donor voice channels and SAT, and their booster assigned translated voice channels.

The flow diagram of FIG. 4A illustrates the process of updating the channel scan list in the stored memory of the control unit 14 of the system 10. The data channel from the Booster B is continuously monitored for new data in a step 130.

The booster B can, in a step 132, either send incremental data (i.e., forward the data for any new channel that was set up), or send the entire active list each time a change in booster status is made. In either case, in step 134, the received channel assignment data is tested to see if any change in status is made, and if the new channel assignments are for the target cell's own mobile or from another cell site.

If the boosted mobile is from the cell site associated with the system 10, then in step 136, the system 10 will not load this channel data into its tables. Otherwise the system 16 would translate the signal back to its co-located cell site channel, and would interfere with the boosted mobile's signal coming back from the booster.

In a step 138, new channels are added to the channel assignment table of the system 10. Translation then takes place back to the frequency F1 originally assigned by the cell site S1 from the frequency F3 assigned by the booster B. The hand-off circuitry of the cell site S2 and the system can then evaluate the received signal and signal strength.

All other active channels being set up at the booster are received via the data channel and updated in the scan list of the system 10. Also, the scan list is updated in steps 140-146 for channels that are dropped by the booster B so that the system 10 hardware will not spend time trying to measure signal strength of a transmission from a mobile that has terminated that call.

The flow chart of FIG. 4B is very similar to that of FIG. 3, with the main difference being that the translating hardware of the system 10 scans only the known active boosted channels from booster B, rather than the entire set of possible boosted channels offset from the donor cell site S1.

From the foregoing, it will be observed that numerous variations and modifications may be effected without departing from the spirit and scope of the invention. It is to be understood that no limitation with respect to the specific apparatus illustrated herein is intended or should be inferred It is, of course, intended to cover by the appended claims all such modifications as fall within the scope of the claims.

We claim:

1. A system for providing an improved hand-off capability for a movable transceiver between a donor and a target cell site where coverage of one of the cell sites if enhanced by a frequency-translation type booster associated with the donor cell site and the movable transceiver is communicating with the donor cell site via the booster, the system comprising:
   means, coupled to the target cell site, for detecting translated communications between the movable transceiver and the booster;
   means, coupled to said detecting means, for translating a detected communication, previously translated by the booster from an original frequency assigned by the donor cell to a second frequency assigned by the booster, back to the original frequency; and
   means coupled to said translating means, for forwarding the back-translated communication to the target cell site.

2. A system as in claim 1 including means, located in part at the booster and in-part at the translating means, for passing information related to enhanced communications from the booster to said means.

3. A system as in claim 1 with said translating means including at least one adjustable, intermediate frequency amplifier means.

4. A system as in claim 1 including means, coupled to said translating means, for controlling said translating.

5. A system for providing an improved hand-off capability for a movable transceiver between a donor and a target cell site where the movable transceiver operates on a donor assigned frequency, and where coverage of one of the cell sites is enhanced by a frequency-translation type booster associated with the donor cell site and the movable transceiver is communicating with the donor cell site via the booster, the system comprising:
   circuitry coupled to the target cell site, for detecting frequency translated communications between the movable transceiver and the booster;
   amplifier circuitry for translating a detected communication, previously translated by the booster, back to a donor cell assigned frequency; and
   a coupler for forwarding the back-translated communication to the target cell site.

6. A system as in claim 5 including circuitry located in part at the booster and in-part at the translating means, for passing information related to enhanced communications from the booster to said means.

7. A system as in claim 5 with said translating circuitry including at least one adjustable, intermediate frequency amplifier means.

8. A system as in claim 5 including a microprocessor coupled to said translating means, for controlling said translating.

9. A system as in claim 5 wherein said amplifier circuitry translates each said detected communication a predetermined amount.

10. An apparatus for facilitating a hand-off, between a donor cell site and a target cell site, of a movable transceiver located in a region serviced by a frequency transferring booster coupled to the donor cell where the transceiver is communicating with the booster on a booster assigned translated frequency, and the booster is communicating with the donor cell site on a donor site assigned frequency, the apparatus comprising:
   means for receiving a translated frequency communication from the movable transceiver;
   means for translating the received communication to the donor site assigned frequency; and
   means for sending said translated communication to the target cell site.

11. An apparatus as in claim 10 with said translating means including adjustable frequency amplifier means coupled to means for controlling said translation.

12. An apparatus as in claim 10 with said translating means including means for maintaining a selected parameter of the received communication at a received value during said translation.

13. An apparatus as in claim 12 with said maintaining means including a unity gain amplifier.

14. An apparatus as in claim 10 including means for receiving translation related information from the booster.

15. An apparatus as in claim 14 with said receiving means including a selected antenna.

16. A method of transferring control of a movable transceiver in communication with a booster, from a first, fixed, transceiver with a first coverage area extended by the booster, to a second fixed transceiver with a second coverage area which is overlapped, in part, by an area of coverage of the booster, the method comprising:

detecting a radio transmission from the movable transceiver to the booster on a frequency assigned by the booster;

translating the detected transmission to a frequency originally assigned thereto by the first, fixed, transceiver; and transferring a representation of the translated transmission to the second transceiver for evaluation.

17. A method as in claim 16 including sending translating related control information from the booster.

18. A method as in claim 16 including storing a translating related frequency off-set.

19. A method as in claim 16 wherein the detected signal has a parameter with a measurable value and including in the translating step, maintaining the value of the parameter of the detected transmission.

20. A method as in claim 16 including storing a plurality of representations of signals.

21. A method as in claim 20 including forming a list of frequencies to be translated.

* * * * *